United States Patent
Chai et al.

(10) Patent No.: US 9,992,349 B2
(45) Date of Patent: *Jun. 5, 2018

(54) POLICY CONTROL METHOD AND SYSTEM, AND RELEVANT APPARATUS

(71) Applicant: HUAWEI TECHNOLOGIES CO., LTD., Shenzhen, Guangdong (CN)

(72) Inventors: Xiaoqian Chai, Shenzhen (CN); Mingjun Shan, Shenzhen (CN); Jiao Kang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/930,897

(22) Filed: Nov. 3, 2015

(65) Prior Publication Data

US 2016/0057293 A1 Feb. 25, 2016

Related U.S. Application Data

(63) Continuation of application No. 13/687,781, filed on Nov. 28, 2012, now Pat. No. 9,197,577, which is a
(Continued)

(30) Foreign Application Priority Data

May 28, 2010 (CN) .......................... 2010 1 0192415

(51) Int. Cl.
*H04L 12/14* (2006.01)
*H04M 15/00* (2006.01)
(Continued)

(52) U.S. Cl.
CPC ............ *H04M 15/66* (2013.01); *H04L 12/14* (2013.01); *H04L 12/1407* (2013.01);
(Continued)

(58) Field of Classification Search
CPC ..... H04L 47/70; H04L 12/14; H04L 12/1407; H04M 15/66
(Continued)

(56) References Cited

U.S. PATENT DOCUMENTS

2006/0008063 A1 1/2006 Harnesk et al.
2009/0305684 A1* 12/2009 Jones ...................... H04L 63/20
455/418
(Continued)

FOREIGN PATENT DOCUMENTS

| CN | 1422061 A | 6/2003 |
|---|---|---|
| CN | 1729648 A | 2/2006 |

(Continued)

OTHER PUBLICATIONS

"Digital cellular telecommunications system(Phase 2 +); Universal Mobile Telecommunications System(UMTS); LTE; Policy and charging control architecture (3GPP TS 23.203 version 8.9 .0 Release 8)", Technical Specification, European Telecommunications Standards Institute (ETSI), 650, Route Des Lucioles ; F-06921 Sophia-Antipolis; France, vol. 3 GPP SA 2, No. V8.9.0, XP014046418, Mar. 1, 2010, total 118 pages.
(Continued)

*Primary Examiner* — David Lazaro
*Assistant Examiner* — Zia Khurshid
(74) *Attorney, Agent, or Firm* — Huawei Technologies Co., Ltd.

(57) ABSTRACT

The present invention discloses a policy control method and system, and a relevant apparatus. The method includes: receiving, by a policy decision apparatus, a control policy request sent by a gateway device, where the control policy request carries a subscriber identifier; sending, by the policy decision apparatus, a session request message carrying the subscriber identifier to a charging system; receiving, by the
(Continued)

policy decision apparatus, a response message; receiving, by the policy decision apparatus, a notification message sent through an established session by the charging system, and generating a service data flow control policy according to information of an occurred charging relevant event; and sending, by the policy decision apparatus, the control policy to the gateway device. The method may implement, based on charging relevant information of a subscriber, policy control of a data flow, flexibility is desirable, and service experience of the subscriber is good.

10 Claims, 10 Drawing Sheets

Related U.S. Application Data continuation of application No. PCT/CN2011/074772, filed on May 27, 2011.

(51) Int. Cl.
  *H04W 4/24* (2018.01)
  *H04L 12/911* (2013.01)
  *H04L 12/24* (2006.01)

(52) U.S. Cl.
  CPC ...... *H04L 12/1425* (2013.01); *H04L 41/5054* (2013.01); *H04L 47/70* (2013.01); *H04M 15/00* (2013.01); *H04W 4/24* (2013.01); *H04L 41/0893* (2013.01)

(58) Field of Classification Search
  USPC ........................................................ 709/225
  See application file for complete search history.

(56) References Cited

U.S. PATENT DOCUMENTS

| | | | |
|---|---|---|---|
| 2010/0043053 | A1 | 2/2010 | Wei et al. |
| 2010/0217877 | A1 | 8/2010 | Willars et al. |
| 2011/0145895 | A1* | 6/2011 | Zhang .................... H04L 47/10 726/4 |
| 2011/0167471 | A1* | 7/2011 | Riley ...................... H04W 4/00 726/1 |
| 2011/0289226 | A1 | 11/2011 | Williams et al. |
| 2012/0117235 | A1* | 5/2012 | Castro Castro ......... H04L 12/14 709/224 |

FOREIGN PATENT DOCUMENTS

| | | |
|---|---|---|
| CN | 101110681 A | 1/2008 |
| CN | 101325780 A | 12/2008 |
| EP | 2192718 A1 | 6/2010 |
| JP | 3851905 B2 | 11/2006 |
| WO | 2009026801 A1 | 3/2009 |
| WO | 2009051527 A1 | 4/2009 |

OTHER PUBLICATIONS

3GPP TS 23.203 V9.4.0 (Mar. 2010), 3rd Generation Partnership Project;Technical Specification Group Services and System Aspects;Policy and charging control architecture (Release 9), total 123 pages.

3GPP TS 29.212 V9.2.0 (Mar. 2010), 3rd Generation Partnership Project; Technical Specification Group Core Network and Terminals; Policy and Charging Control over Gx reference point (Release 9), total 111 pages.

* cited by examiner

POLICY CONTROL METHOD AND SYSTEM, AND RELEVANT APPARATUS

CROSS-REFERENCE TO RELATED APPLICATIONS

This application is a continuation of U.S. patent application Ser. No. 13/687,781, filed on Nov. 28, 2012, now allowed, which is a continuation of International Application No. PCT/CN2011/074772, filed on May 27, 2011, which claims priority to Chinese Patent Application No. 201010192415.5, filed on May 28, 2010, both of which are hereby incorporated by reference in their entireties.

FIELD OF THE INVENTION

The present invention relates to the field of data communications technologies, and in particular, to a policy control method and system, and a relevant apparatus.

BACKGROUND OF THE INVENTION

With the large-scale deployment of the 3rd-generation (3rd-generation, 3G) mobile network, data services are used more and more widely. For an operator, a desirable quality of service (Quality of Service, QoS) needs to be provided in order to enhance competitiveness.

A policy mechanism system for a data service is provided in the prior art, the architecture of which is as shown in FIG. 1. The system includes a policy and charging rule function apparatus (Policy and Charging Rules Function, PCRF) 11, an application function (Application Function) apparatus 12, a subscription profile repository (Subscription Profile Repository, SPR) 13, a gateway (Gateway) device 14, and a charging apparatus 15. The charging apparatus 15 may be an online charging system (Online Charging System, OCS) or an offline charging system (Offline Charging System, OFCS), and may perform real-time charging for a subscriber according to traffic or duration statistics in a gateway. The PCRF may perform a service data flow control policy decision according to subscriber information from the subscription profile repository 13, bearer level information of the gateway device 14, some local policies locally configured at the PCRF or service level information of the application function apparatus 12, so as to determine a service data flow control policy. The gateway device 14 controls a service data flow according to the service data flow control policy, thereby ensuring the quality of service.

Referring to FIG. 2, FIG. 2 is a flow chart of a policy control method according to the prior art.

The policy control method in the prior art includes:

A1. A PCRF receives a total traffic use quota from an SPR.

A2. The PCRF generates a service data flow control policy, where the control policy includes a monitoring keyword, a use information report event trigger, and a traffic use threshold determined according to the total traffic use quota.

A3. The PCRF sends the control policy to a gateway device.

A4. The gateway device performs policy control on a data flow of a subscriber service according to the control policy, and accumulates traffic of the data flow that passes through the gateway and satisfies the policy.

A5. When an accumulated value of the gateway apparatus reaches the use threshold specified in the control policy, or the accumulated value does not reach the use threshold specified in the control policy but satisfies data flow interruption of the policy, or the accumulated value satisfies another data flow use information report condition, the gateway device reports the accumulated traffic information to the PCRF, where the use information includes the monitoring keyword and accumulated traffic information.

A6. The PCRF deducts the reported accumulated traffic information from the total traffic use quota. If the service needs to continue and a total traffic use quota after the deduction is greater than zero, it is considered that a new use quota needs to be delivered to the gateway device, steps A2 to A5 are repeated until eventually the subscriber data flow service stops, and step A7 is executed. If the total traffic use quota after the deduction is equal to or smaller than zero, indicating that the total use quota is used up, the control policy of the service flow is adjusted according to an operator policy or a subscriber policy, and a new data flow control policy is sent to the gateway device until eventually the subscriber data flow service stops, and step A7 is executed.

A7. After the service stops, the PCRF saves the rest of the total traffic use quota in the SPR.

During an implementation process of the present invention, the inventor finds that in the prior art the PCRF may implement policy control based on traffic accumulation but cannot implement policy control of the data flow based on charging relevant information of the subscriber, so flexibility is low and service experience of the subscriber is poor.

SUMMARY OF THE INVENTION

The present invention provides a policy control method and system that are capable of policy control of a data flow according to charging relevant information of a subscriber, and a corresponding apparatus.

To solve the foregoing technical problems, embodiments of the present invention are implemented through the following technical solutions.

An embodiment of the present invention provides a policy control method, including: receiving, by a policy decision apparatus, a control policy request sent by a gateway device, where the control policy request carries a subscriber identifier;

sending, by the policy decision apparatus, a session request message to a charging system, where the session request message carries the subscriber identifier;

receiving, by the policy decision apparatus, a response message of the session request message, where the response message is sent by the charging system;

receiving, by the policy decision apparatus, a notification message sent through an established session by the charging system, and generating a service data flow control policy according to information of an occurred charging relevant event carried in the notification message; and sending, by the policy decision apparatus, the control policy to the gateway device according to the control policy request.

An embodiment of the present invention further provides another policy control method, including:

receiving, by a charging system, a session request message sent by a policy decision apparatus, where the session request message carries a subscriber identifier;

sending, by the charging system, a response message of the session request message to the policy decision apparatus according to the session request message;

obtaining, by the charging system, a charging relevant event to be monitored; and sending, by the charging system, a notification message to the policy decision apparatus through an established session when the charging relevant event occurs, where the notification message is used for indicating that the charging relevant event already occurs.

An embodiment of the present invention further provides a policy decision apparatus, including:

a policy request receiving unit, configured to receive a control policy request sent by a gateway device, where the control policy request carries a subscriber identifier;

a session establishing unit, configured to send a session request message to a charging system, where the session request message carries the subscriber identifier;

a response message receiving unit, configured to receive a response message of the session request message, where the response message is sent by the charging system;

a notification message receiving unit, configured to receive a notification message sent through an established session by the charging system;

a policy generating unit, configured to generate a service data flow control policy according to information of an occurred charging relevant event carried in the notification message; and a policy sending unit, configured to send the control policy to the gateway device according to the control policy request.

An embodiment of the present invention further provides a charging system, including:

a session request receiving unit, configured to receive a session establishment request message sent by a policy decision apparatus, where the session establishment request message carries a subscriber identifier;

a response message sending unit, configured to send a response message to the policy decision apparatus according to the session request message;

an event obtaining unit, configured to obtain a charging relevant event to be monitored;

an event monitoring unit, configured to monitor whether the charging relevant event occurs; and a notification message sending unit, configured to, when the event monitoring unit monitors that the charging relevant event occurs, send a notification message to the policy decision apparatus through an established session, where the notification message is used for indicating that the charging relevant event already occurs.

An embodiment of the present invention further provides a management node device, including:

an event defining unit, configured to define a charging relevant event according to an operator policy or subscriber subscription information, and meanwhile define an event class, and a charging system processing rule and policy generation rule which are corresponding to the charging relevant event; and an event configuring unit, configured to configure the charging relevant event respectively for a policy decision apparatus and a charging system, based on the class of the charging relevant event.

An embodiment of the present invention further provides a policy control system, including the foregoing policy decision apparatus, the foregoing charging system, and the foregoing management node device.

In the embodiments of the present invention, a policy decision apparatus receives a notification message sent through an established session by a charging system, the notification message carries information of a charging relevant event that already occurs, the policy decision apparatus further combines the charging relevant event that currently already occurs to generate and deliver a control policy. Compared with the prior art, the embodiments of the present invention may implement policy control of the data flow based on the charging relevant information of the subscriber, so flexibility is desirable and service experience of the subscriber is good.

BRIEF DESCRIPTION OF THE DRAWINGS

To illustrate the technical solutions according to the embodiments of the present invention more clearly, accompanying drawings for describing the embodiments and the prior art are introduced below briefly. Obviously, the accompanying drawings in the following descriptions are only some embodiments of the present invention, and persons of ordinary skill in the art may derive other drawings from the accompanying drawings without making creative efforts.

DETAILED DESCRIPTION OF THE EMBODIMENTS

The technical solutions of the present invention are clearly and completely described in the following with reference to the accompanying drawings. Obviously, the described embodiments are only part of rather than all of the embodiments of the present invention. All other embodiments obtained by persons of ordinary skill in the art based on the embodiments of the present invention without making creative efforts shall fall within the protection scope of the present invention.

The present invention provides a policy control method and system, and a relevant apparatus. For better understanding of the technical solutions of the present invention, the embodiments provided in the present invention are described in detail below with reference to the accompanying drawings.

Figure 1:
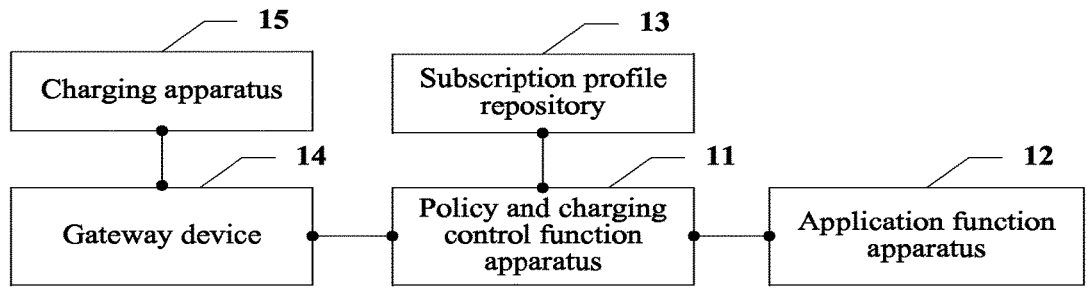
FIG. 1 is a schematic structural diagram of a policy mechanism system for a data service according to the prior art.
Figure 2:
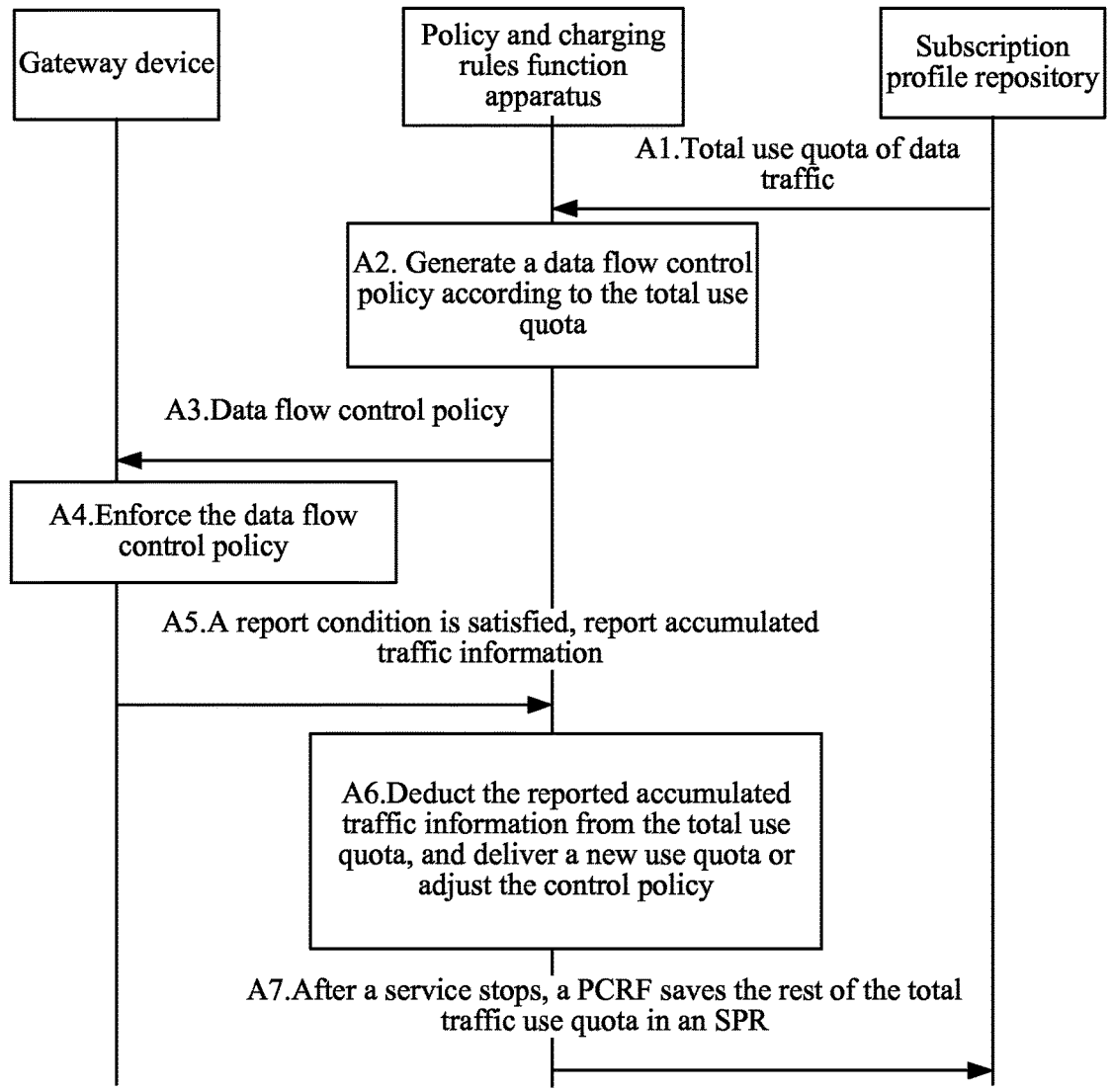
FIG. 2 is a flow chart of a policy control method according to the prior art.
Figure 3:
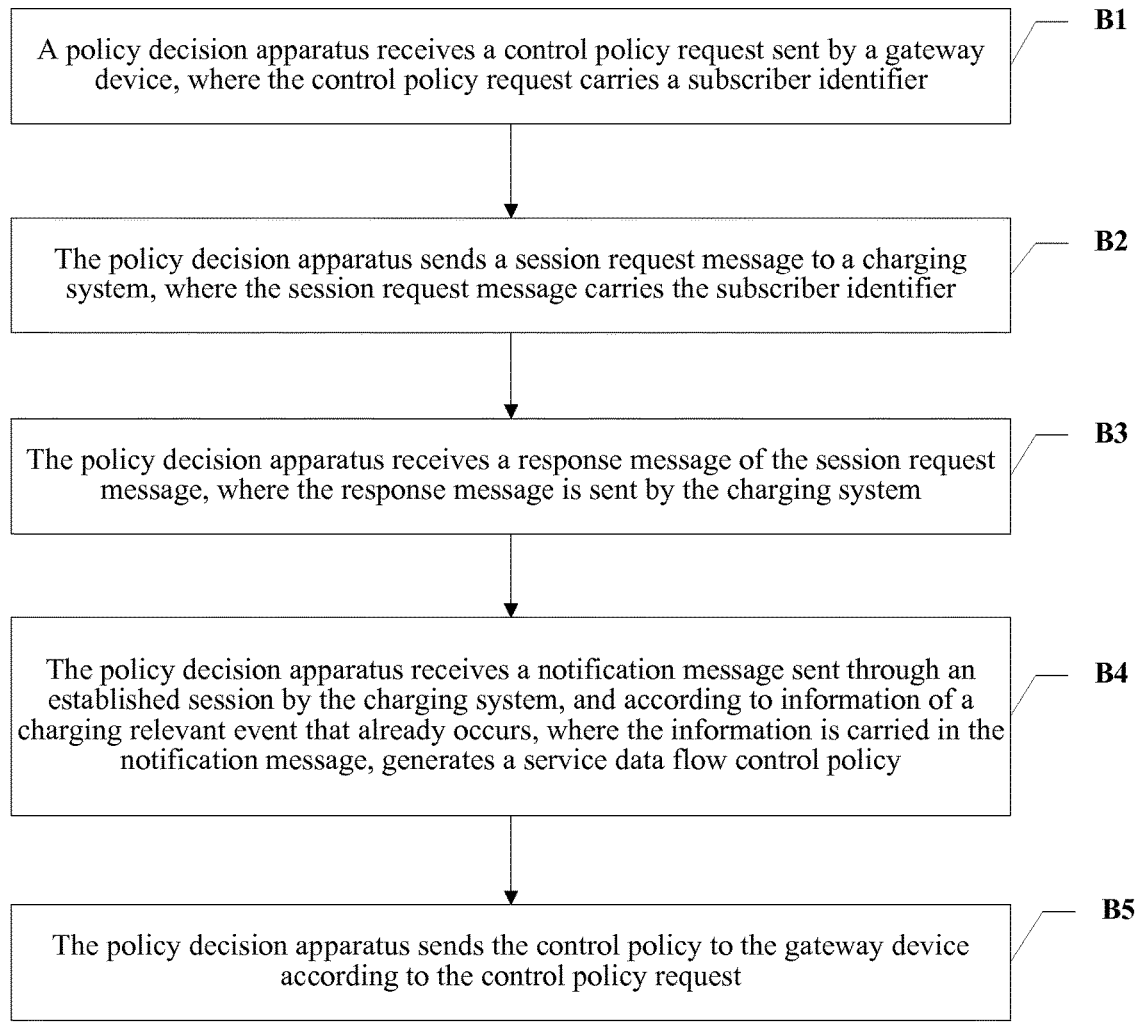
FIG. 3 is a flow chart of a policy control method according to a first embodiment of the present invention.

Referring to FIG. 3, FIG. 3 is a flow chart of a policy control method according to a first embodiment of the present invention. The policy control method provided in an embodiment of the present invention may include:

B1: A policy decision apparatus receives a control policy request sent by a gateway device, where the control policy request carries a subscriber identifier.

Specifically, upon receiving a bearer establishment request of a user equipment, the gateway device sends to the policy decision apparatus the control policy request to request a service data flow control policy. The service data flow control policy request carries the subscriber identifier.

B2: The policy decision apparatus sends a session request message to a charging system, where the session request message carries the subscriber identifier.

Specifically, upon receiving the control policy request, the policy decision apparatus determines that a session needs to be established with the charging system, and sends the session request message carrying the subscriber identifier to the charging system. The session request message may further carry a session identifier which is used for identifying the session between the charging system and the policy decision apparatus. All subsequent messages in the session may carry the session identifier. The charging system in the present invention is mainly an online charging system or is another system with real-time subscriber charging relevant data.

In the embodiment of the present invention, the policy decision apparatus determines whether a session between the policy decision apparatus and the charging system needs to be established, according to subscription data of a subscriber, a subscriber attribute, a service attribute and/or an operator policy. For example, whether the subscriber is an online charging subscriber, and whether the service is an online charging service. If the session between the policy decision apparatus and the charging system needs to be established, further the policy decision apparatus determines whether an another session is already established for the subscriber between the policy decision apparatus and the charging system. If the another session is already established, the another session may be reused; and if no another session between the policy decision apparatus and the charging system is already established, the policy decision apparatus determines that a session between the policy decision apparatus and the charging system need to be established.

Upon receiving the session request message, the charging system returns a corresponding response message of the session request message. The response message carries the session identifier.

B3: The policy decision apparatus receives the response message of the session request message, The response message is sent by the charging system.

Specifically, the policy decision apparatus receives the response message of the session request message. The response message is sent by the charging system. The response message indicates that an application session between the policy decision apparatus and the charging system is successfully established, where the response message carries the subscriber identifier.

In addition, the charging system obtains a charging relevant event. The charging relevant event corresponds to the subscriber identifier and needs to be monitored for occurrence. The charging relevant event may be, for example, a account balance of the subscriber is lower than a preset amount. When the charging relevant event occurs, the charging system sends a notification message to a policy control module. The occurrence of the charging relevant event in the embodiment of the present invention may be construed as that a certain variable in the charging system satisfies a certain preset condition, or a certain message is received. Reference may be made to the description here for the charging relevant event mentioned in the subsequent embodiments.

B4: The policy decision apparatus receives a notification message sent through an established session by the charging system, and generates a service data flow control policy according to information of a charging relevant event that already occurs, where the information of a charging relevant event that already occurs is carried in the notification message Specifically, the policy decision apparatus receives the notification message sent through the established session by the charging system. The notification message carries the information of the charging relevant event that already occurs. The charging relevant event may be a first class charging relevant event to which the policy decision apparatus subscribes from the charging system, and may also be a second class charging relevant event that needs to be monitored and is automatically determined by the charging system. The policy decision apparatus generates the service data flow control policy according to the information of the charging relevant event that already occurs. The policy decision apparatus may generate the service data flow control policy according to the information of the charging relevant event and a preset policy generation rule.

In the embodiments of the present invention, the policy generation rule may be set according to an operator policy or subscriber subscription information, and he policy generation rule may be prestored in the policy decision apparatus. The policy generation rule may be sent to the policy decision apparatus by a newly added management node device in the embodiment of the present invention. The policy generation rule may be, for example, when the balance of the subscriber is lower than the preset amount, decreasing current quality of service or decreasing a bandwidth of the subscriber. Occurrence of different events may correspond to different processing rules, and the policy generation rule may further be adjusted according to a network condition and/or tariff standard.

B5: The policy decision apparatus sends the control policy to the gateway device according to the control policy request.

Specifically, in the embodiment of the present invention, the policy decision apparatus may send the generated control policy to the gateway device according to the control policy request. The gateway device executes the control policy to control a data service of the subscriber.

In the embodiments of the present invention, the policy decision apparatus receives the notification message sent by the charging system through the established session, the notification message carries the information of the charging relevant event that already occurs, and the policy decision apparatus generates and delivers the control policy according to the charging relevant event that already occurs currently. Compared with the prior art, the embodiment of the present invention may implement policy control of a data flow based on charging relevant information of the subscriber, and configuration and the monitoring of the charging relevant event as well as a triggering mechanism are flexible, so that an operator may perform flexible configuration according to an event feature and an operational policy, and implement lean control of the service data flow at a low cost, the flexibility is desirable, and service experience of the subscriber is good.

Figure 4:
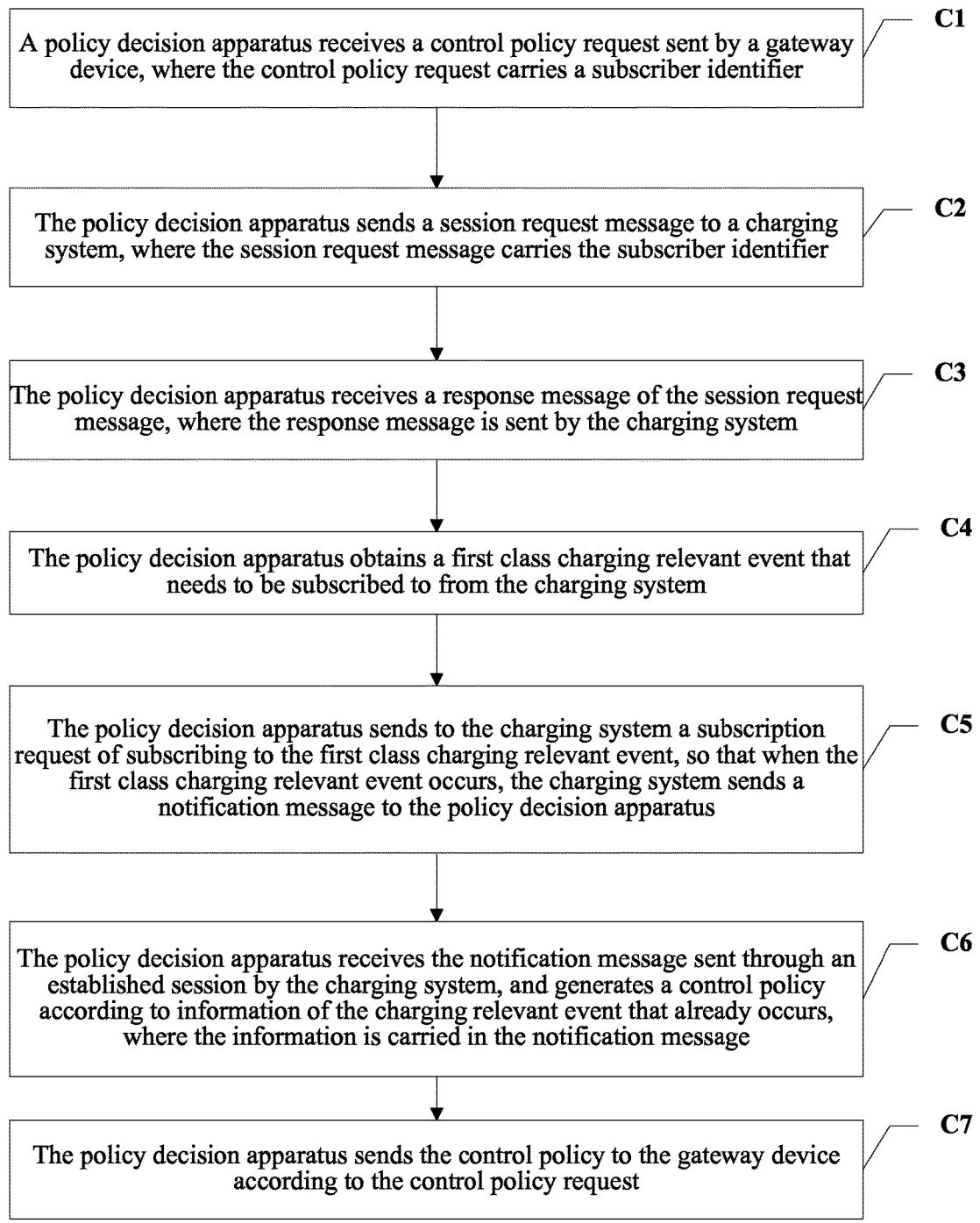
FIG. 4 is a flow chart of a policy control method according to a second embodiment of the present invention.

FIG. 4 is a flow chart of a policy control method according to a second embodiment of the present invention.

The policy control method provided in the second embodiment of the present invention may include:

C1: A policy decision apparatus receives a control policy request sent by a gateway device, where the control policy request carries a subscriber identifier.

C2: The policy decision apparatus sends a session request message to a charging system, where the session request message carries the subscriber identifier.

C3: The policy decision apparatus receives a response message of the session request message, where the response message is sent by the charging system.

A procedure of executing the foregoing steps C1 to C3 is the same as that of executing steps B1 to B3 in the first embodiment, which is not repeatedly described here.

C4: The policy decision apparatus obtains a first class charging relevant event that needs to be subscribed to from the charging system.

Specifically, the policy decision apparatus may determine, according to subscriber subscription information, an operator policy, and so on, a charging relevant event that needs to be subscribed to from the charging system. The policy decision apparatus may, according to information such as service data flow information, service information, rate group information and/or subscriber information, retrieve a corresponding first class charging relevant event in a preset set formed of charging relevant events. The first class charging relevant event may be called a subscribed event. If the first class charging relevant event is found, the policy decision apparatus determines that the first class charging relevant event needs to be subscribed to from the charging system. The charging relevant event may be sent to the policy decision apparatus in advance or preconfigured in the policy decision apparatus, and a source of the charging relevant event shall not cause limitation on the embodiments of the present invention.

Specifically, when the first class charging relevant event is retrieved according to the service information, a service needs to be identified firstly. The process of identifying the service specifically includes: receiving, by the policy decision apparatus, the service data flow information reported by the gateway device, and identifying the service according to the service data flow information and based on a certain matching rule. The policy decision apparatus may further receive the service information sent by an AF, and bind the service information and a service data flow, and the service is identified as long as the binding is completed. The policy decision apparatus may further receive a service identification result sent by a DPI (Deep packet inspection, deep packet inspection) module. It should be pointed out that the policy decision apparatus may also determine and identify the service in other manners.

After determining the charging relevant event that needs to be subscribed to, the policy decision apparatus may further judge whether a precondition of the charging relevant event is satisfied; and if the precondition of the charging relevant event is satisfied, the policy decision apparatus sends a subscription request to the charging system through the session. The policy decision apparatus may, before sending the subscription request, further judge whether other services currently used by the subscriber have already subscribed to the charging relevant event through the session; if the other services currently used by the subscriber have already subscribed to the charging relevant event through the session, the subscription by the other services currently used by the subscriber is shared and the subscription does not need to be repeated. Definitely, the charging system may also, after receiving a subscription event request of the policy decision apparatus, filter a repetitive subscription request.

C5: The policy decision apparatus sends to the charging system the subscription request of subscribing to a first class charging relevant event, so that when the first class charging relevant event occurs, the charging system sends a notification message to the policy decision apparatus.

Specifically, the policy decision apparatus sends to the charging system the subscription request of subscribing to the first class charging relevant event in the session request message or sends to the charging system the subscription request of subscribing to the first class charging relevant event through an established session, where the subscription request carries the first class charging relevant event. The policy decision apparatus may send the subscription request to the charging system when the session is being established or after the session is established.

Upon receiving the subscription request, the charging system monitors whether the first class charging relevant event carried in the subscription request occurs, and when the first class charging relevant event occurs, the charging system sends the notification message to the policy decision apparatus, where the notification message carries the occurred first class charging relevant event.

C6: The policy decision apparatus receives the notification message sent through the established session by the charging system, and generates a control policy according to information of the charging relevant event that already occurs, where the information of the charging relevant event is carried in the notification message.

Specifically, upon receiving the information of the first class charging relevant event that already occurs, where the information is sent by the charging system through the session, the policy decision apparatus updates a subscription status of the first class charging relevant event, and generates a service data flow control policy based on the first class charging relevant event that already occurs in combination with other input conditions.

C7: The policy decision apparatus sends the control policy to the gateway device according to the control policy request.

Reference may be made to steps B4 and B5 in the foregoing first embodiment for a procedure of executing steps C6 and C7, which is not repeatedly described here.

In an embodiment of the policy control method provided in the second embodiment of the present invention, the policy decision apparatus obtains a first class charging relevant event corresponding to the service information, and sends to the charging system the subscription request of subscribing to the first class charging relevant event, so that when the first class charging relevant event occurs, the charging system sends the notification message to the policy decision apparatus. Compared with the prior art, in the embodiment of the present invention, when a charging relevant event of the subscriber service information occurs, policy control may be performed according to the charging relevant event, so that during different services performed by the subscriber, different charging relevant events are monitored, thereby further increasing flexibility of the policy control.

Figure 5:
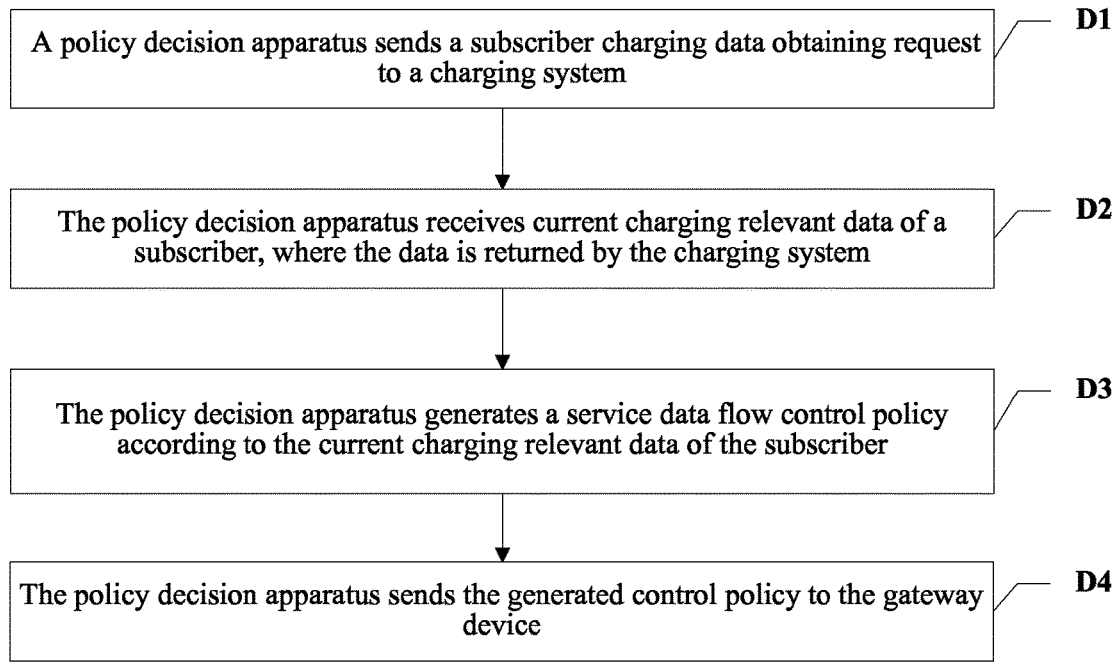
FIG. 5 is a flow chart of a method for deciding a policy according to current charging relevant data of a subscriber according to an embodiment of the present invention.

FIG. 5 is a flow chart of a method for deciding a policy according to current charging relevant data of a subscriber according to an embodiment of the present invention.

In the policy control method provided in the first embodiment or the second embodiment of the present invention, to generate, based on subscriber charging data, an initial control policy for a certain service data flow, the policy decision apparatus may further execute the following steps.

D1: The policy decision apparatus sends a subscriber charging data obtaining request to the charging system.

Specifically, the policy decision apparatus may carry the subscriber charging data obtaining request in the session request message to request subscriber charging relevant data. In addition, the policy decision apparatus may further, after the session is established, send to the charging system the subscriber charging data obtaining request through the established session to obtain current charging relevant data of the subscriber, and then execute step D2.

D2: The policy decision apparatus receives the current charging relevant data of the subscriber, where the current charging relevant data is returned by the charging system.

Specifically, the policy decision apparatus receives the current charging relevant data of the subscriber returned by the charging system, according to the subscriber charging data obtaining request carried in the session request or according to the subscriber charging data obtaining request sent through the session. The current charging relevant data of the subscriber may be one or more pieces of the following information: a current account balance of the subscriber, a traffic accumulated counter of the subscriber within a certain period, consumption information of the subscriber within a certain period, a subscriber level, and a subscription package.

D3: The policy decision apparatus generates the service data flow control policy according to the current charging relevant data of the subscriber.

Specifically, the policy decision apparatus may generate the service data flow control policy according to the current charging relevant data of the subscriber. A specific method of generating the service data flow control policy may be: generating, by the policy decision apparatus, the service data flow control policy according to a built-in policy generation rule in combination with the current charging relevant data of the subscriber and other input conditions. For example, a call charge balance in the current charging data of the subscriber is 10 yuan, and then the policy decision apparatus matches the condition in the policy generation rule and decides a corresponding QoS for the service data flow of the subscriber in combination with other conditions.

D4: The policy decision apparatus sends the generated service data flow control policy to the gateway device.

In the embodiment of the present invention, the policy decision apparatus sends the generated service data flow control policy to the gateway device. The gateway device executes the received service data flow control policy to control the data service of the subscriber.

According to the embodiment of the present invention, the current charging relevant data of the subscriber is obtained, and the service data flow control policy is further generated according to the current charging relevant data of the subscriber, so that the data service of the subscriber based on a current account or consumption status of the subscriber may be implemented control. Compared with the prior art, the embodiment of the present invention adapts to more application scenarios and an application scope is wider.

Furthermore, according to the embodiment of the present invention, upon receiving the current charging relevant data of the subscriber, the policy decision apparatus may buffer the received charging relevant data, and further, upon receiving the notification message sent by the charging system, the policy decision apparatus updates the buffered charging relevant data according to event information carried in the notification message. The embodiment of the present invention may reduce the times of interactions between the policy decision apparatus and the charging system by buffering the received charging relevant data, thereby further decreasing a processing burden of the charging system, and significantly improving real-time processing performance of the online charging system.

Figure 6:
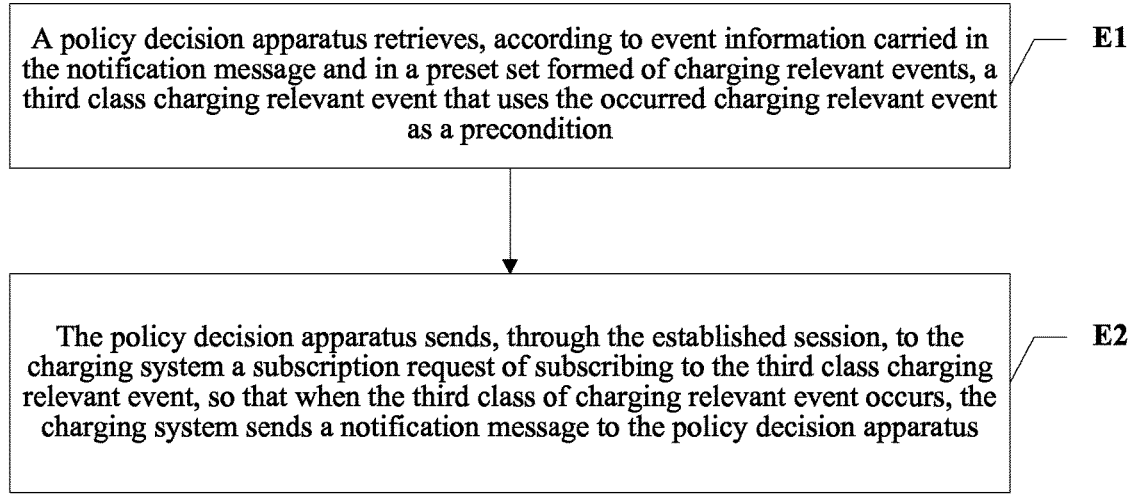
FIG. 6 is a flow chart of a method for sending a subscription request according to time information carried in a notification message in a policy control method according to an embodiment of the present invention.

FIG. 6 is a flow chart of a method for sending a subscription request according to event information carried in a notification message in a policy control method according to an embodiment of the present invention.

In the policy control method provided in the first embodiment or the second embodiment of the present invention, after the notification message sent by the charging system is received, a subscription request may be further sent to the charging system according to the event information carried in the notification message, and the procedure mainly includes:

E1: The policy decision apparatus retrieves, according to the event information carried in the notification message and in the preset set formed of the charging relevant events, a third class charging relevant event which uses an occurred charging relevant event as a precondition.

Specifically, the policy decision apparatus retrieves, according to the event information carried in the notification message and in the preset set formed of the charging relevant events, a charging relevant event which uses an occurred charging relevant event as a precondition. According to the embodiment of the present invention, the found charging relevant event is referred to as a third class charging relevant event.

E2: The policy decision apparatus sends, through the established session, to the charging system a subscription request of subscribing to the third class charging relevant event, so that when the third class charging relevant event occurs, the charging system sends a notification message to the policy decision apparatus.

Specifically, the policy decision apparatus sends, through the established session, to the charging system the subscription request of subscribing to the third class charging relevant event, where the subscription request carries the third class charging relevant event.

Upon receiving the subscription request, the charging system monitors whether the third class charging relevant event occurs, and when the event occurs, the charging system sends the notification message to the policy decision apparatus. After receiving the notification message, the policy decision apparatus decides a policy according to the event information in the notification message.

It should be noted that upon receiving the notification message carrying the third class charging relevant event, the policy decision apparatus may still retrieve, according to the event information carried in the notification message and in the preset set formed of the charging relevant events, a charging relevant event that uses the charging relevant event as a precondition and perform subscription, that is, execute steps E1 to E2 again.

In the embodiment of the present invention, the subscription request is sent to the charging system according to the event information carried in the notification message, which adapts to more application scenarios, and a use scope is wide. In addition, in the embodiment of the present invention, by configuring an event-class precondition for an event, policy decision of service data flow control based on a class of event with a special precondition is implemented, and by using the method, flexible and accurate policy control across different event domains when the subscriber uses the data service may be solved, so that the operator may perform precise and flexible lean control of the service data flow.

In the embodiments of the present invention, the notification message which is sent by the charging system through the foregoing session and received by the policy decision apparatus may carry an occurred first class charging relevant event and/or second class charging relevant event. Upon receiving an occurred charging relevant event sent by the charging system, the policy decision apparatus firstly performs retrieval in the first class charging relevant events to which is subscribed; if found, it indicates that it is a first class charging relevant event, then the policy decision apparatus updates a subscription status of the first class charging relevant event, and generates the service data flow control policy; and if the retrieval fails, the policy decision apparatus continue to perform retrieval in the preset second class charging relevant events, and after the retrieval is successful, the policy decision apparatus generates the service data flow control policy according to the occurred second class charging relevant event. The policy decision apparatus supports a processing capability on the second class charging relevant event, so that the policy decision apparatus does not need to subscribe to the event and maintains a subscription status of the event, which may significantly decrease the cost for subscription processing and subscription management of the policy decision apparatus, decrease stress of the policy decision apparatus and the charging system, and meanwhile implement lean control of the service data flow based on rich information of the charging system.

The policy control method provided in the embodiments of the present invention is described in the foregoing from the side of a policy decision apparatus, and the policy control method provided in the embodiments of the present invention is described in the following from the side of a charging system.

Figure 7:
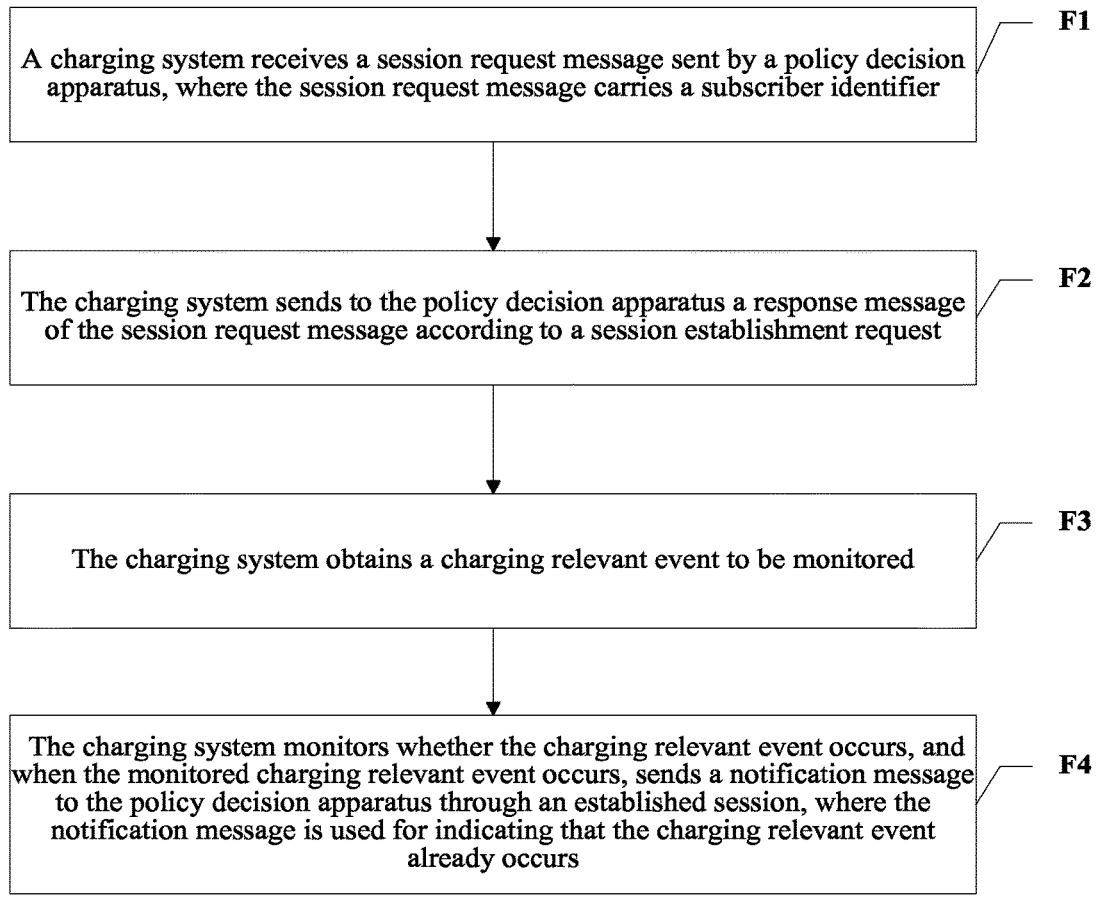
FIG. 7 is a flow chart of a policy control method according to a third embodiment of the present invention.

FIG. 7 is a flow chart of a policy control method according to a third embodiment of the present invention.

The policy control method provided in the third embodiment of the present invention mainly includes:

F1: A charging system receives a session request message sent by a policy decision apparatus, where the session request message carries a subscriber identifier.

In the embodiment of the present invention, the charging system receives the session request message sent by the policy decision apparatus, where the session request message carries the subscriber identifier, and the session request message may further carry a session identifier.

F2: The charging system sends to the policy decision apparatus a response message of the session request message according to a session establishment request.

The response message indicates that the session is successfully established between the policy decision apparatus and the charging system, where the response message may carry the session identifier.

F3: The charging system obtains a charging relevant event to be monitored.

The monitoring in the present invention refers to a behavior that the charging system can learn occurrence of a subscribed charging relevant event or non-subscribed charging relevant event, and the charging system can, after an event occurs, according to a subscription behavior of the policy decision apparatus or configuration of a management node, trigger reporting to the policy decision apparatus the occurred charging relevant event. It should be pointed out that, the monitoring does not limit a specific implementation method of learning the occurrence of an event and triggering a report action in the charging system.

Specifically, the charging system may obtain, in the following manners, the charging relevant event to be monitored.

1) The charging system receives a subscription request sent by the policy decision apparatus in the session request message or in a subsequent session, where the subscription request carries a charging relevant event to which the policy decision apparatus needs to subscribe.

Upon deciding a first class charging relevant event that needs to be subscribed to from the charging system, the policy decision apparatus sends a subscription request of subscribing to the first class charging relevant event to the charging system through the session request message or the subsequent session, and the charging system receives the subscription request. The subscription request carries the charging relevant event to which the policy decision apparatus needs to subscribe.

2) The charging system retrieves a preset set formed of the charging relevant events for a charging relevant event corresponding to the subscriber identifier.

The charging system may, according to the session request message sent by the policy decision apparatus, automatically retrieve, in a preset set formed of the charging relevant events in the charging system, a second class charging relevant event corresponding to the subscriber identifier, that is, the second class charging relevant event is a non-subscribed event. The charging relevant event may be preconfigured in the charging system, and a source of the charging relevant event shall not cause limitation on the embodiments of the present invention.

The management node may further configure a precondition of the event at the same time, so as to further determine whether current charging relevant data of a subscriber satisfies the precondition of the event after the second class charging relevant event is found; and if current charging relevant data of a subscriber satisfies the precondition of the event, the management node determines that the charging relevant event that needs to be sent to the policy decision apparatus.

In the embodiment of the present invention, the charging relevant event corresponding to the subscriber identifier may be, for example, an account balance of the subscriber is lower than a certain limit, or a daily traffic accumulated counter of the subscriber reaches a certain limit.

It should be noted that, steps F2 and F3 are not subject to a strict precedence, and F3 may be executed before F2.

F4: The charging system monitors whether the charging relevant event occurs, and when the monitored charging relevant event occurs, the charging system sends a notification message to the policy decision apparatus through the established session, where the notification message is used for indicating that the charging relevant event already occurs.

Specifically, the charging system monitors whether the charging relevant event occurs, and when the monitored charging relevant event occurs, sends the notification message to the policy decision apparatus through the session established in step F2, where the notification message is used for indicating that the charging relevant event already occurs, and the notification message may carry one or multiple charging relevant events that already occur.

The policy decision apparatus receives the notification message sent through the session by the charging system, and performs policy decision according to event information in the notification message. Reference may be made to the first embodiment and the second embodiment of the foregoing method for a detailed procedure of the policy decision performed by the policy decision apparatus, which is not repeatedly described here.

In the policy control method provided in the third embodiment of the present invention, upon monitoring that the charging relevant event occurs, the charging system sends the notification message to the policy decision apparatus through the established session, so that the policy decision apparatus generate and delivers a control policy in combination with the charging relevant event that already occurs currently. Compared with the prior art, the embodiment of the present invention may implement policy control of a data flow based on charging relevant information of the subscriber, and the configuration and monitoring of the charging relevant event as well as a triggering mechanism are flexible, so that an operator may perform flexible configuration according to an event feature and an operational policy, and implement lean control of a service data flow at a low cost, and flexibility is desirable.

Figure 8:
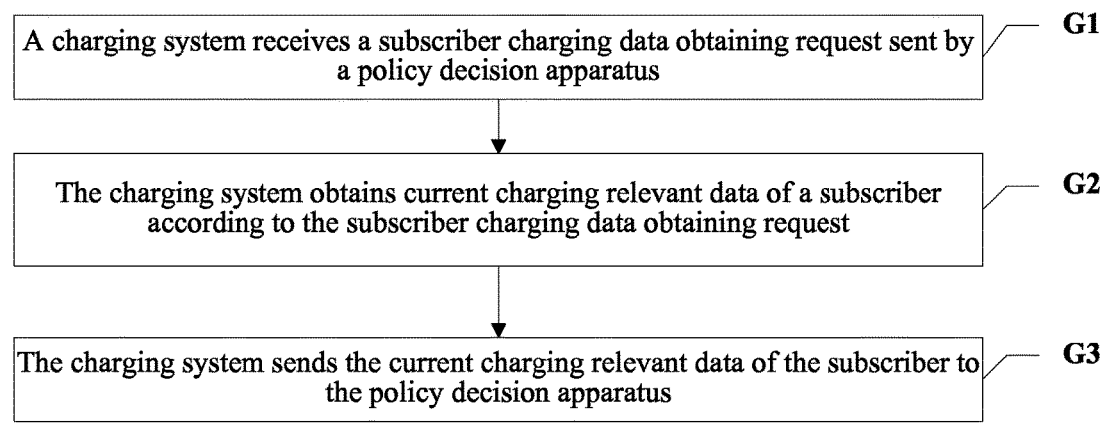
FIG. 8 is a flow chart of a method for sending current charging relevant data of a subscriber to a policy decision apparatus in a policy control method according to an embodiment of the present invention.

FIG. 8 is a flow chart of a method for sending current charging relevant data of a subscriber to a policy decision apparatus in the policy control method according to the embodiment of the present invention.

In the policy control method provided in the third embodiment of the present invention, a procedure that the charging system sends the current charging relevant data of the subscriber to the policy decision apparatus may include:

G1: The charging system receives a subscriber charging data obtaining request sent by the policy decision apparatus.

Specifically, the session request message received by the charging system may further carry the subscriber charging data obtaining request, and the request is used for obtaining the current charging relevant data of the subscriber. Alternatively, the charging system receives the subscriber charging data obtaining request sent through the session by the policy decision apparatus, to obtain the current charging relevant data of the subscriber. Upon receiving the subscriber charging data obtaining request sent by the policy decision apparatus, the charging system executes step G2.

G2: The charging system obtains the current charging relevant data of the subscriber according to the subscriber charging data obtaining request.

The charging system stores the current charging relevant data of the subscriber. The current charging relevant data of the subscriber may be, for example, a current account balance of the subscriber, current various traffic accumulations of the subscriber, or current various consumption accumulations of the subscriber.

G3: The charging system sends the current charging relevant data of the subscriber to the policy decision apparatus.

Specifically, if the subscriber charging data obtaining request is contained in the session request message, the charging system sends the current charging relevant data of the subscriber to the policy decision apparatus in the response message of the session request message, and if the subscriber charging data obtaining request is sent through the session, the charging system sends the current charging relevant data of the subscriber in a response message of a subscriber data obtaining request.

Upon receiving the current charging relevant data of the subscriber, the policy decision apparatus generates the control policy according to the current charging relevant data of the subscriber and sends the generated control policy to a gateway device. The gateway device performs control on a data service of the subscriber according to the received control policy. The policy decision apparatus generates the control policy according to a preset policy generation rule, the current charging relevant data of the subscriber and other input conditions.

According to the embodiment of the present invention, the current charging relevant data of the subscriber is obtained at the beginning of the session or during course of the session, and the current charging relevant data of the subscriber is sent to the policy decision apparatus, so that the policy decision apparatus generates the control policy according to the current charging relevant data of the subscriber, which remedies a defect that the notification message sent by the charging system only reflects a change of the charging relevant data of the subscriber during a use procedure of the service but cannot reflect a history status of the charging relevant data of the subscriber when the service starts, so that the policy decision apparatus may perform accurate service data flow control based on a complete real-time condition of the charging relevant data of the subscriber in the whole procedure of the service.

Figure 9:
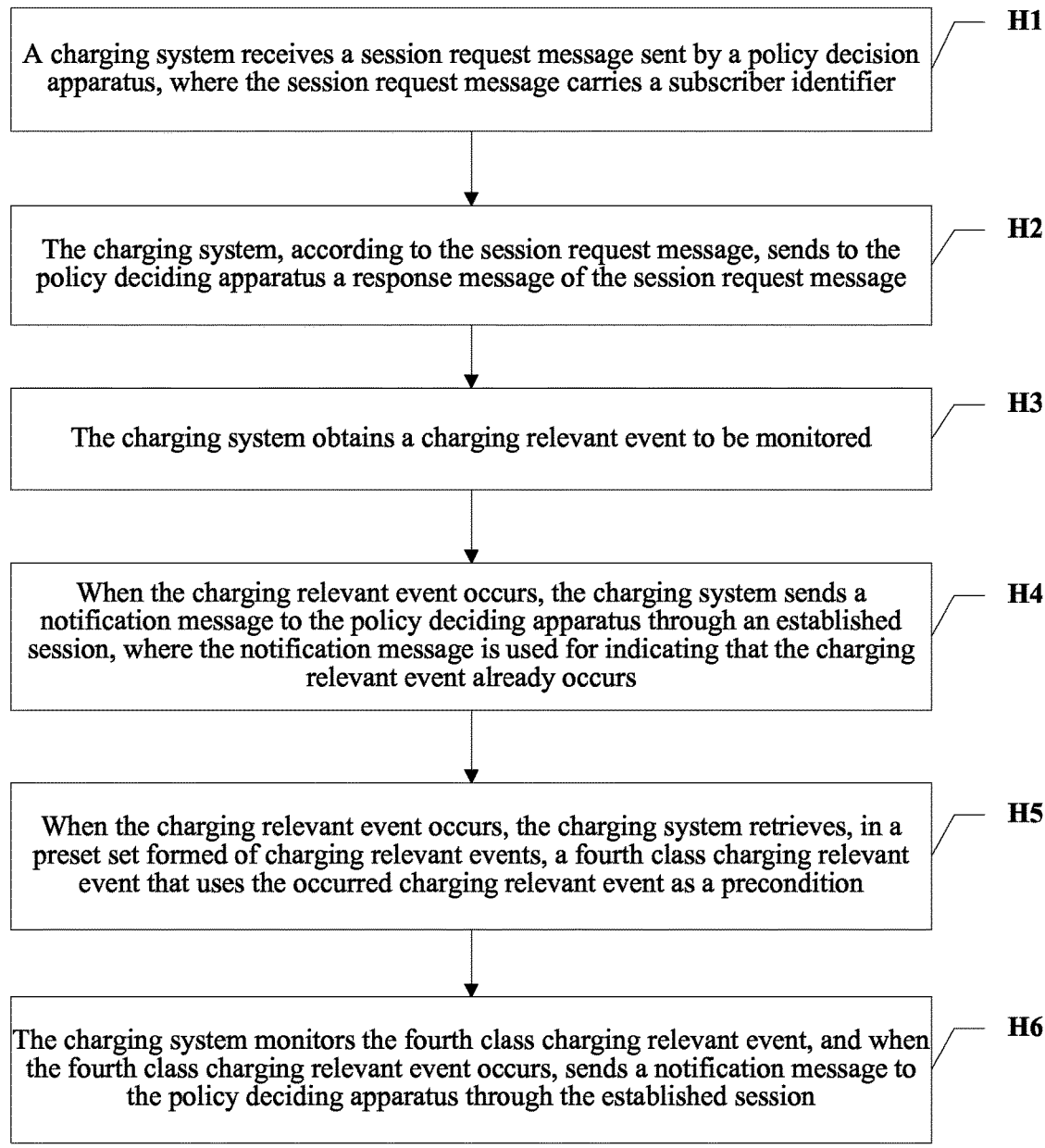
FIG. 9 is a flow chart of a policy control method according to a fourth embodiment of the present invention.

FIG. 9 is a flow chart of a policy control method according to a fourth embodiment of the present invention.

The policy control method provided in the fourth embodiment of the present invention may specifically include:

H1: A charging system receives a session request message sent by a policy decision apparatus, where the session request message carries a subscriber identifier.

H2: The charging system, according to the session request message, sends to the policy decision apparatus a response message of the session request message.

H3: The charging system obtains a charging relevant event to be monitored.

H4: When the charging relevant event occurs, the charging system sends a notification message to the policy decision apparatus through an established session, where the notification message is used for indicating that the charging relevant event already occurs.

A procedure of executing steps H1 to H4 is the same as of that of executing steps F1 to F4 in the foregoing third embodiment, which is not repeatedly described here.

H5: When the charging relevant event occurs, the charging system retrieves, in a preset set formed of the charging relevant events, a fourth class charging relevant event that uses the occurred charging relevant event as a precondition.

Specifically, when the charging relevant event occurs, the charging system retrieves, in the preset set formed of the charging relevant events, a charging relevant event that uses the occurred charging relevant event as a precondition. In the embodiment of the present invention, the found charging relevant event is referred to as a fourth class charging relevant event.

It should be pointed out that step H4 and step H5 are not subject to a time sequence.

H6: The charging system monitors the fourth class charging relevant event, and when the fourth class charging relevant event occurs, the charging system sends a notification message to the policy decision apparatus through the established session.

The notification message carries information of an occurred event, and the policy decision apparatus performs policy decision according to the event information in the notification message. Reference may be made to the first embodiment and the second embodiment of the foregoing method for a detailed procedure of the policy decision performed by the policy decision apparatus, which is not repeatedly described here.

It should be noted that when the fourth class charging relevant event occurs, the charging system may still retrieve, in the preset set formed of the charging relevant events, a charging relevant event that uses the charging relevant event as a precondition and perform subscription, that is, execute steps H5 and H6 again.

In the policy control method provided in the fourth embodiment of the present invention, an event-class precondition is configured for an event, and policy decision of service data flow control based on a class of event with a special precondition is implemented. By using the method, flexible and accurate policy control across different event domains when a subscriber uses a data service is solved, so that an operator may perform precise and flexible lean control of service data flows.

To better understand the policy control method provided in the embodiments of the present invention in detail, a specific application scenario of the embodiments of the present invention is given as follows.

Devices that perform interaction in this application scenario include: a policy decision apparatus, a charging system, a gateway device, and a management node device. The charging system in the application scenario is an online charging system or another apparatus which has real-time charging relevant data of a subscriber.

The newly added management node device, according to an operator policy or subscriber subscription information and so on, defines a charging relevant event, a precondition of the event, a processing rule of the charging system corresponding to the event, and a policy generation rule of the policy decision apparatus corresponding to the event, and correspondingly sends the charging relevant event and the relevant rules to the policy decision apparatus and the charging system, so that the charging system and the policy decision apparatus perform corresponding processing after the charging relevant event occurs. The gateway device may be a gateway GPRS support node (Gateway GPRS Support Node, GGSN) of a general packet radio service (General Packet Radio Service, GPRS) network, a packet data gateway (Packed Data Network Gateway, PDN-GW) of an EPC (Evolved Packet Core, evolved core network) network, or other built-in policy and charging execution function (Policy and Charging Execution Function, PCEF) modules, and the gateway device may execute a control policy sent by the policy decision apparatus and control the data service.

Figure 10:
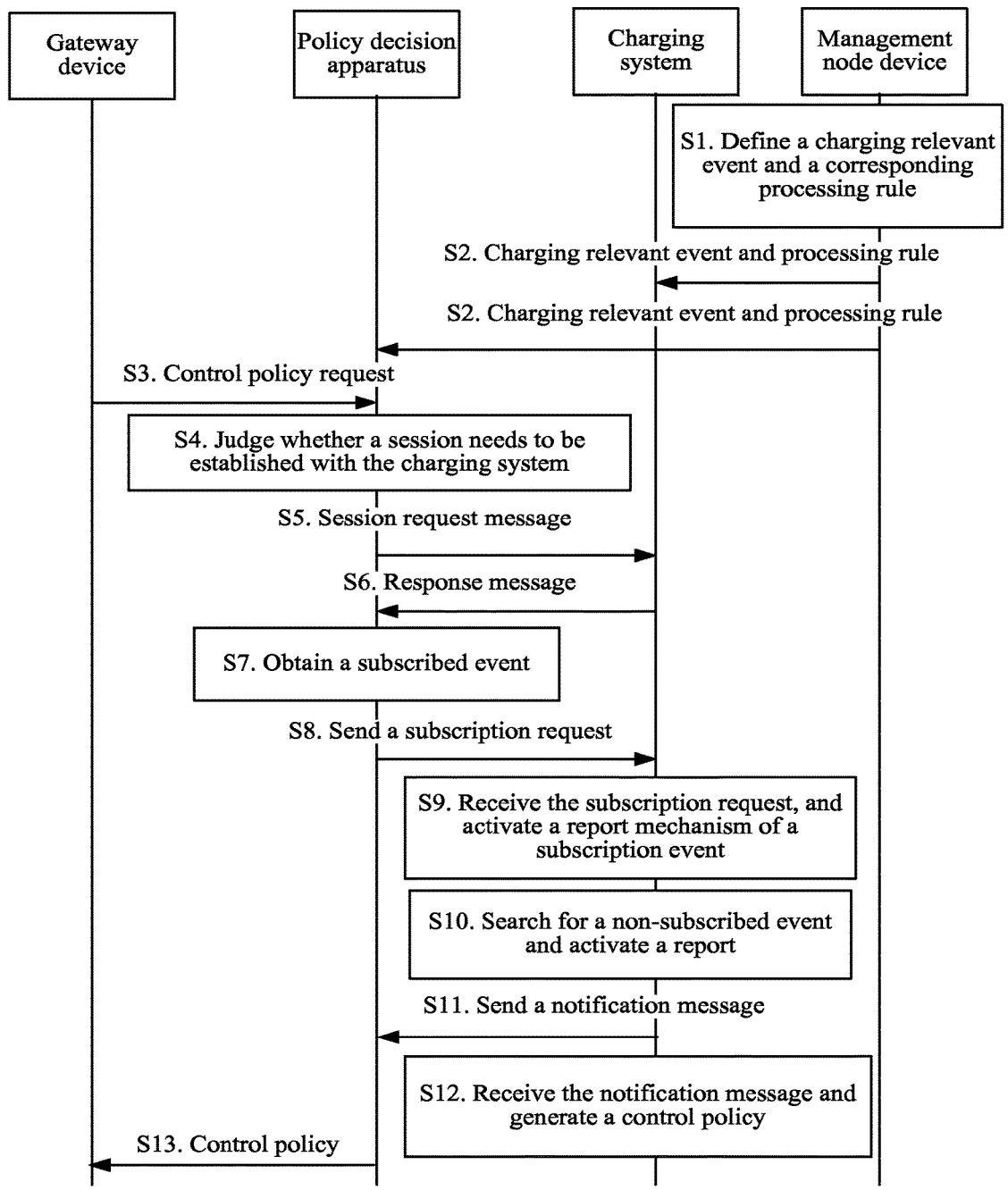
FIG. 10 is a flow chart of a policy control method according to a fifth embodiment 5 of the present invention.

FIG. 10 is a flow chart of a policy control method according to a fifth embodiment of the present invention.

The policy control method provided in the fifth embodiment of the present invention mainly includes:

S1: A management node defines a charging relevant event and a corresponding processing rule according to an operator definition and/or subscriber subscription information.

Specifically, the management node receives configuration information of an operator, subscriber subscription information and so on, and defines an event of a control policy used for subscriber service data flow control. The charging relevant event may be a specific event of a specifically designated accumulation rule, for example, consumption of a data service reaches 200 yuan. The charging relevant event may also be a general event of one accumulation rule, where the accumulation rule is not specifically designated, a specific accumulation rule needs to be designated through an event in combination with another parameter, and the another parameter may be an accumulation rule identifier or an accumulated amount. For example, the event is a balance change, and the another parameter may be that a current value of a balance is 8 yuan.

In the embodiment of the present invention, a precondition of the event may also be defined when defining the event, and the precondition in the present invention refers to an occurrence premise of the event. The precondition may be a non-event-class precondition. For example, for an event indicating that a certain subscriber data service accumulated counter reaches 100 M, the precondition is that the subscriber data service accumulated counter must be smaller than 100 M when the event is activated. The precondition may also be an event-class precondition, that is, occurrence of another event is the premise of occurrence of the event. For example, for an event "a balance is higher than a preset minimum threshold value", the precondition may be the occurrence of another event "a balance is lower than a preset minimum threshold value".

The defined event may cover the following contents.

1) An event indicating that accumulated counters of various granularities reach a preset threshold value: An accumulation unit includes an accumulated counter of traffic, duration, consumption amount, and the number of messages. An accumulate period may include a day, a week, a month, and the like. An accumulation item may be a service class such as a speech service, a data service, and a message service. Also, it may be an accumulated counter based on a rate group, and the rate group is a set formed of a group of services with the same rate. It may also be an accumulated counter used for a single service (identifying a service with the rate group and/or a service identifier). A precondition of this class of event is: a current accumulated counter is lower than the preset threshold value, or an event that "an accumulation is reset" occurs.

2) An event indicating that an accumulated counter in a charging function module is reset: It refers to that when the accumulated counter reaches a preset threshold value, due to a preset reset condition of an accumulation item defined by an operator, the accumulation data is reset. For example, the accumulation policy is daily periodic accumulation, and the accumulation data of the previous day is reset after zero o'clock. The precondition of the event is: a current accumulated counter reaches or becomes higher than a preset threshold value, or an event that "the accumulated counter reaches a preset threshold value" occurs.

3) An event indicating that an account balance is lower than a preset threshold value: It indicates that the balance of a certain account or all accounts of the subscriber is lower than a certain threshold value. The precondition is: the current balance is higher than the preset threshold value, or an event that "a balance is higher than a preset threshold value" occurs.

4) An event indicating that an account balance is higher than a preset threshold value: It indicates that the balance of a certain account or all accounts of the subscriber is higher than a certain threshold value, which includes that after the subscriber account balance is lower than the preset threshold value, the subscriber account balance becomes higher than the preset threshold value again because of recharge, or presentation from the operator. The precondition is that the current balance is lower than the preset threshold value or an event that "a balance is lower than a preset threshold value" occurs.

5) An event indicating presentation of traffic for use: It indicates that the charging function module starts to authorize the subscriber to use the traffic presented by the operator instead of the traffic paid by the subscriber, and events might need to be respectively defined for use start and use end of the presented traffic.

6) An event in other charging systems, for example, the number of times of recharge or a recharge amount within a certain period.

In the embodiments of the present invention, the defined charging relevant events are classified as follows.

Non-subscribed event: an event that affects control of QoS and bandwidths of data service flows on all gateways, or an event that the operator regards unnecessary to be subscribed to by a policy decision apparatus. The non-subscribed event does not need to be related to a specific data service, so it is not necessary to confirm which services are currently being used, and this class of event may become effective by configuration. That is, this class of event is configured in a charging system, and the charging system determines, according to a condition of a session between the policy decision apparatus and the charging system, whether a report is needed, and the policy decision apparatus does not need to subscribe to it. The second class charging relevant event and fourth class charging relevant event in the foregoing embodiments are the both non-subscribed events.

Subscribed event: an event that only affects some certain service data flows on the gateway. As this class of event is only related to some certain services, a service that is currently being used need to be determined first. The policy decision apparatus may learn the service that is currently being used, but the charging system cannot learn it, so this class of event needs to be subscribed to in order to become effective. That is, the policy decision apparatus, in use of the service or during the use, subscribes to this class of event that is related to the service, from the charging system. The first class charging relevant event and the third class charging relevant event in the foregoing embodiments are both the subscribed events.

It should be pointed out that whether a certain event specifically belongs to a non-subscribed event or a subscribed event is determined according to an operation policy of the operator and positioning of the event by the operator.

Furthermore, while the event is classified and defined, a processing rule of the charging system and a policy generation rule of the policy decision apparatus which are corresponding to the defined event may be as follows.

The processing rule of the charging system refers to that the charging system correlates the event with an accumulation item or a balance change monitoring item; in the case of a non-subscribed event, further needs to specify that the charging system, after the accumulation item or balance change reaches a threshold value, automatically reports the event based on a certain condition, no matter whether the policy decision apparatus subscribes to the event or not.

The policy generation rule of the policy decision apparatus refers to that the policy decision apparatus correlates the event with one or multiple service data flows, and defines policies such as QoS and a bandwidth when a combination of the event and other inputs is used as a condition.

S2: The management node sends the defined charging relevant event and corresponding processing rule to the charging system and the policy decision apparatus.

In the embodiment of the present invention, after defining the foregoing charging relevant event and the corresponding processing rule, the management node device may send the charging relevant event and the corresponding processing rule to the policy decision apparatus and the charging system in advance. The management node device may perform configuration on the policy decision apparatus and the charging system based on an event class. A configuration object may be a single subscriber, a package subscriber, or a subscriber of a certain level. Configuration information includes one or multiple of a service identifier, a rate group, an event, a precondition of an event, and a policy generation rule that are to be configured for the policy decision apparatus. The management node device configures one or multiple of the event, the precondition of the event, the accumulation rule, an event class, and so on, for the charging system. The charging system performs different processing on different classes of events, where the accumulation rule may include an accumulation item, an accumulation manner, an accumulation period, and the like. The event class may include a subscribed class and a non-subscribed class.

S3: The policy decision apparatus receives a control policy request sent by a gateway device.

The control policy request is used for requesting a control policy and carries a subscriber identifier.

S4: The policy decision apparatus judges whether a session needs to be established with the charging system.

Specifically, the policy decision apparatus determines, according to subscriber subscription data, a subscriber attribute, a service attribute, an operator policy, and the like, whether a session needs to be established with the charging system; if the session needs to be established with the charging system, further determines whether a session is already established between the policy decision apparatus and the charging system for the subscriber; if the session is already established, the already established session is reused, and then the step S7 is executed; and if no session is established, the policy decision apparatus determines that a session needs to be established between the policy decision apparatus and the charging system, and the step S5 is executed.

S5: The policy decision apparatus sends a session request message to the charging system, where the request message carries the subscriber identifier and a charging data obtaining request.

The request message carries the subscriber identifier to bind the session to a certain specific subscriber by the charging system. The request message may further include the obtaining request for obtaining current charging relevant data of the subscriber on the charging system, so as to obtain the current charging relevant data of the subscriber on the charging system when the session is established, which is used as an input parameter for the policy decision apparatus to generate a service flow control policy initially. For one same subscriber, only one interactive session exists between the policy decision apparatus and the charging system, so multiple services of the subscriber share the session.

S6: The charging system returns a response message, where the response message carries the current charging relevant data of the subscriber.

Specifically, the charging system sends the response message to the policy decision apparatus, indicating that the session is successfully established. Meanwhile, if the session request message carries the obtaining request for the current charging relevant data of the subscriber, the current charging relevant data of the subscriber is sent in the response message to the policy decision apparatus.

S7: The policy decision apparatus obtains a subscribed event.

Specifically, the policy decision apparatus may, according to the subscriber subscription information, the operator policy, and the like, determines a charging relevant event that needs to be subscribed to from the charging system. The policy decision apparatus may, according to service data flow information, service information, rate group information and/or subscriber information, retrieve a corresponding charging relevant event in a preset set formed of the charging relevant events; and if the corresponding charging relevant event is found, the policy decision apparatus determines that the charging relevant event needs to be subscribed to from the charging system, that is, the subscribed event. The charging relevant event may be sent to the policy decision apparatus in advance or preconfigured in the policy decision apparatus, and a source of the charging relevant event shall not cause limitation on the embodiments of the present invention.

S8: The policy decision apparatus sends a subscription request to the charging system.

Specifically, after determining the charging relevant event that needs subscription, the policy decision apparatus determines whether a precondition of the charging relevant event is satisfied; and if the precondition of the charging relevant event is satisfied, the policy decision apparatus sends the subscription request to the charging system through the session. The policy decision apparatus, before sending the subscription request, may further judge whether other currently used services of the subscriber have already subscribed to the event in the session; if the other currently used services of the subscriber have already subscribed to the event in the session, share the subscription and repetitive subscription is not needed. Definitely, the charging system may also, after receiving a subscription event request of the policy decision apparatus, filter a repetitive subscription request.

S9: The charging system receives the subscription request, and activates a report mechanism of a subscription event.

Specifically, after receiving the subscription request of the policy decision apparatus, the charging system activates the report mechanism of the charging relevant event subscribed to in the subscription request, that is, the charging system monitors the subscription event, and sends a notification message to the policy decision apparatus when the subscription event occurs, and the method turns to step S11.

S10: The charging system retrieves a non-subscribed event corresponding to the subscriber and activates a report mechanism.

Specifically, after the interactive session between the policy decision apparatus and the charging system is completed, the charging system, according to configuration of the management node, automatically retrieves, in the set formed of charging relevant events, a non-subscribed event suitable for the subscriber identifier, and when confirming that a precondition of the non-subscribed event is satisfied, activates the report mechanism of the non-subscribed event.

It should be pointed out that the foregoing steps S6 and S9 are not subject to a strict execution sequence, and a sequence in the numbers is irrelevant to a sequence of time.

S11: When the subscribed event or non-subscribed event subscribed to by the policy decision apparatus occurs, the charging system sends the notification message to the policy decision apparatus.

Specifically, upon monitoring that the subscribed event or non-subscribed event subscribed to by the policy decision apparatus occurs, the charging system sends to the policy decision apparatus the notification message used for indicating that the event already occurs and the notification message carrying information of the occurred event.

When the event occurs, the charging system may further retrieve a non-subscribed event which uses the event as a precondition and activates it. Specifically, when a certain event occurs, the charging system automatically retrieves for the non-subscribed event which is suitable for the subscriber and uses the occurrence of the event as the precondition, and automatically activates the non-subscribed event. A process of processing the activated non-subscribed event by the charging system is similar to a process of processing other events, that is, after the charging system activates report setting of the event, when the event occurs, the event is instantly reported to the policy decision apparatus, that is, the notification message is sent.

S12: The policy decision apparatus receives the notification message and generates the control policy.

Specifically, after receiving the notification message sent by the charging system, the policy decision apparatus, according to the event information in the notification message and the policy generation rule preconfigured by the management node, generates the control policy.

In addition, the policy decision apparatus may further, after receiving the notification message, retrieve a subscribed event that uses an occurred charging relevant event as a precondition, and subscribe to it from the charging system.

S13: The policy decision apparatus sends the control policy to the gateway device.

Specifically, the policy decision apparatus sends the generated control policy to the gateway device, and the gateway device executes the control policy to implement control on the subscriber service data flow.

The policy control method provided in the fourth embodiment of the present invention may further include an unsubscription step, and specifically three unsubscription methods are respectively described as follows.

1) The policy decision apparatus sends an unsubscription command to the charging system. The unsubscription command carries one or multiple or all events to be unsubscribed from; or the unsubscription command is for subscribing to a special event, where the special event indicating unsubscription of all the events, for example, an unsubscribe-all-events (UNSUBSCRIBE-ALL-EVENTS) event.

2) If all services of the subscriber are ended, the policy decision apparatus requests that the interactive session between the policy decision apparatus and the charging system be terminated, so the charging system automatically invalidates all subscribed events of the policy decision apparatus when the interactive session terminates, and meanwhile invalidates all non-subscribed events of which the report setting is automatically activated by the charging system.

3) In a service use procedure, if the charging relevant event occurs, the charging system may automatically invalidate the report setting of the event after successfully reporting the event to the policy decision apparatus.

In the policy control method provided in the fifth embodiment of the present invention, the management node configures the event, the precondition of the event, the processing rule, and the like for a policy decision module and the charging system based on the event class, and based on the configuration of the management node, the non-subscribed event and the subscribed event may be differentiated. For the non-subscribed event, the charging system may automatically activate the report setting of the non-subscribed event when the interactive session between the policy decision module and the charging system is established and does not need the subscription by the policy decision module. As the non-subscribed event has a low occurrence probability, and occupies a high proportion among all events that can be reported by the charging system to the policy decision apparatus, the unsubscription may significantly decrease the cost of subscription processing and subscription management by the policy decision apparatus and the charging system, decrease burdens of the policy decision apparatus and the charging system, and meanwhile implement lean control of the service data flow based on rich information of the charging system.

A sixth embodiment of the present invention provides a policy control method to further describe the subscription method in other embodiments of the present invention in detail.

After receiving a subscription request of a policy decision apparatus, the charging system, according to configuration of a management node and its own capability, judges whether a certain charging relevant event in the request is supported or whether the charging relevant event can be identified or whether a precondition of the charging relevant event is satisfied; if the charging relevant event is not supported or cannot be identified or the precondition of the charging relevant event is not satisfied, rejects the subscription of the charging relevant event. Optionally, subscription failure information is returned to the policy decision apparatus for the event, and the failure does not affect subscription processing of other charging relevant events in the request. That is to say, the charging system performs the same determination on other charging relevant events, and does not reject subscription of other charging relevant events due to the subscription failure. It should be noted that, if the request has multiple charging relevant events whose subscription fail and failure information needs to be returned to the policy decision apparatus, the charging system combines the corresponding subscription failure information in one same response message and returns it to the policy decision apparatus.

Alternatively, when the charging system determines that in the subscription request sent by the policy decision apparatus, any charging relevant event is not supported or cannot be identified or a precondition of the charging relevant event is not satisfied, rejects the subscription request message, that is, rejects the subscription of all events in the subscription request message, and returns a response message of the request message, indicating that all the events fail to be subscribed to.

Update of subscribed events by the policy decision apparatus in the established session, as shown in step E2, may be specifically implemented in the following manners.

Method 1: The policy decision apparatus sends a subscription update message to the charging system, where the message only carries a charging relevant event that needs to be newly subscribed to and a subscription request or a charging relevant event that needs to be unsubscribed from and an unsubscription request, and does not carry an unaffected charging relevant event. Upon receiving the subscription update message, the charging system, based on a group of events subscribed to by the policy decision apparatus previously and the update message, adds the subscription of the new charging relevant event, and unsubscribes from the charging relevant event that the message requests to unsubscribe.

Method 2: The policy decision apparatus sends a subscription update message to the charging system, where the subscription update message has to carry all charging relevant events and a subscription request, that is, includes a newly subscribed charging relevant event and a charging relevant event that is already subscribed to but still needs subscription, that is to say, all charging relevant events that currently need subscription need to be sent. Upon receiving the subscription update message, the charging system unsubscribes from all events subscribed to by the policy decision apparatus previously, and performs the subscription to all the charging relevant events in the subscription update message.

The policy control methods provided in the embodiments of the present invention are described in detail in the foregoing, and in the following an apparatus corresponding to the method embodiments of the present invention is given.

Figure 11:
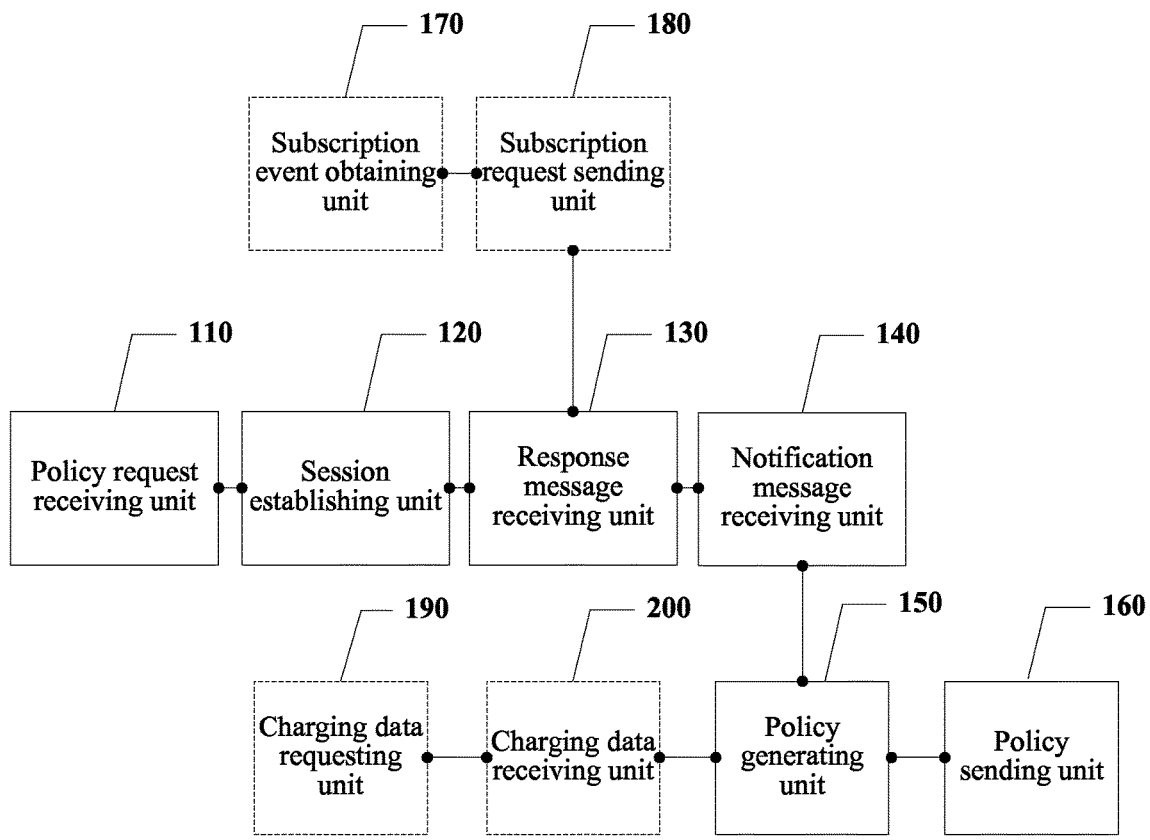
FIG. 11 is a schematic structural diagram of a policy decision apparatus according to a seventh embodiment of the present invention.

FIG. 11 is a schematic structural diagram of a policy decision apparatus according to a seventh embodiment of the present invention.

The policy decision apparatus provided in the sixth embodiment of the present invention includes:

a policy request receiving unit 110, configured to receive a control policy request sent by a gateway device, where the control policy request carries a subscriber identifier;

a session establishing unit 120, configured to send a session request message to a charging system, where session request message carries the subscriber identifier;

a response message receiving unit 130, configured to receive a response message of the session request message, where the response message is sent by the charging system;

a notification message receiving unit 140, configured to receive a notification message sent through an established session by the charging system;

a policy generating unit 150, configured to, according to information of a charging relevant event that already occurs, where the information is carried in the notification message, generate a service data flow control policy; and a policy sending unit 160, configured to, according to the control policy request, send the control policy to the gateway device.

The policy decision apparatus provided in the sixth embodiment of the present invention may be used in the policy control method provided in the foregoing corresponding first embodiment, and reference may be made to the foregoing method embodiment for a detailed execution procedure, which is not repeatedly described here.

Furthermore, the policy decision apparatus provided in the embodiment of the present invention may further include:

a subscription event obtaining unit 170, configured to obtain a first class charging relevant event that needs to be subscribed to from the charging system; and a subscription request sending unit 180, configured to send a subscription request of subscribing to the first class charging relevant event to the charging system, so that the charging system, when the first class charging relevant event occurs, sends the notification message to the policy decision apparatus.

In the embodiment of the policy control method provided in the second embodiment of the present invention, the policy decision apparatus obtains the first class charging relevant event corresponding to service information, and sends the subscription request of subscribing to the first class charging relevant event to the charging system, so that the charging system, when the first class charging relevant event occurs, sends the notification message to the policy decision apparatus. Compared with the prior art, in the embodiment of the present invention, when the charging relevant event corresponding to the subscriber service information occurs, policy control may be performed according to the charging relevant event, so that during different services performed by a subscriber, different charging relevant events can be monitored, thereby further increasing flexibility of policy control.

Furthermore, the policy decision apparatus provided in the embodiment of the present invention further includes:

a charging data requesting unit 190, configured to send a subscriber charging data obtaining request to the charging system; and a charging data receiving unit 200, configured to receive current charging relevant data of the subscriber, where the data is returned by the charging system.

The policy generating unit 150 is further configured to, according to the current charging relevant data of the subscriber, generate the control policy, and the policy sending unit 160 is further configured to send the control policy generated to the gateway device according to the charging relevant data.

Figure 12:
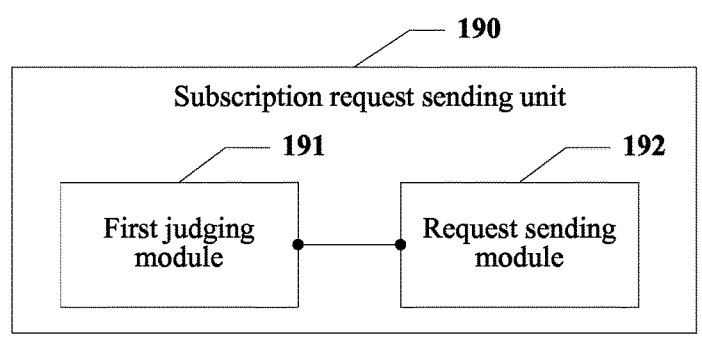
FIG. 12 is a schematic structural diagram of a subscription request sending unit in a policy decision apparatus according to an embodiment of the present invention.

FIG. 12 is a schematic structural diagram of a subscription request sending unit in a policy decision apparatus according to an embodiment of the present invention.

Furthermore, the foregoing subscription event obtaining unit 170 is further configured to obtain a precondition corresponding to the first class charging relevant event.

The subscription request sending unit 190 includes:

a first judging module 191, configured to judge whether the precondition of the first class charging relevant event is satisfied; and a request sending module 192, configured to, when the first judging module 191 determines that the precondition is satisfied, send the subscription request to the charging system through the established session, where the subscription request carries the first class charging relevant event satisfying the precondition.

Figure 13:
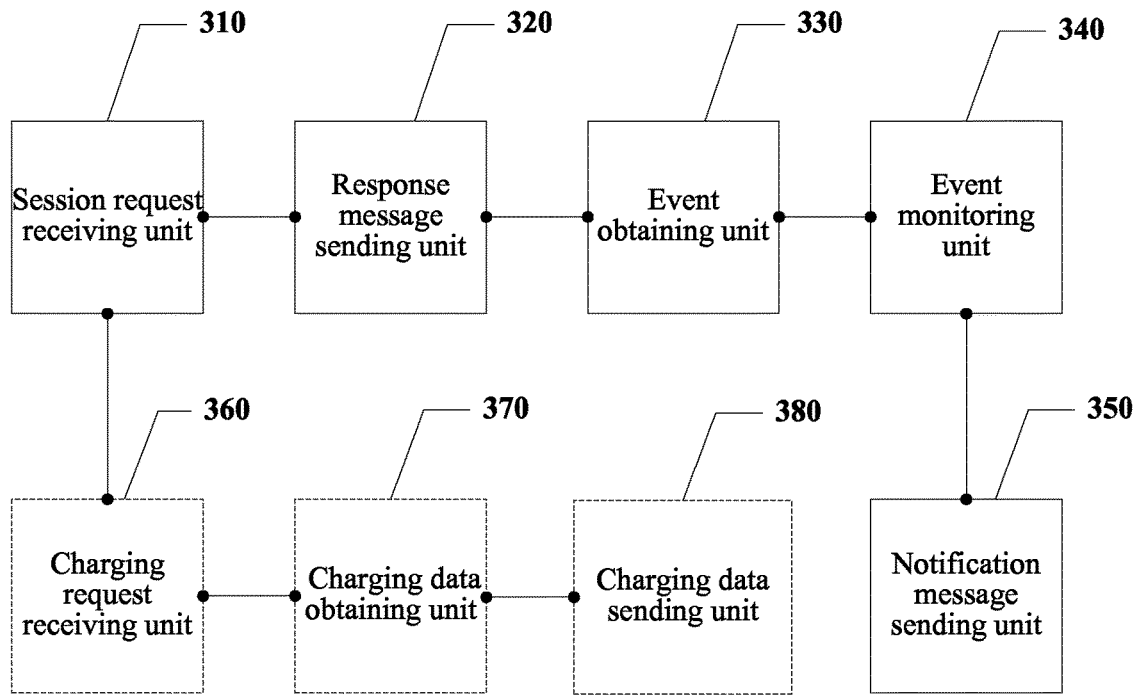
FIG. 13 is a schematic structural diagram of a charging system according to an eighth embodiment of the present invention.

FIG. 13 is a schematic structural diagram of a charging system according to an eighth embodiment of the present invention.

The charging system provided in the seventh embodiment of the present invention includes:

a session request receiving unit 310, configured to receive a session request message sent by a policy decision apparatus, where the session request message carries a subscriber identifier;

a response message sending unit 320, configured to, according to the session request message, send a response message to the policy decision apparatus;

an event obtaining unit 330, configured to obtain a charging relevant event to be monitored;

an event monitoring unit 340, configured to monitor whether the charging relevant event occurs; and a notification message sending unit 350, configured to, when the event monitoring unit 340 monitors that the charging relevant event occurs, send a notification message to the policy decision apparatus through an established session, where the notification message is used for indicating that the charging relevant event already occurs.

The charging system provided in the seventh embodiment of the present invention may be used in the policy control method provided in the foregoing corresponding third embodiment, and reference may be made to the method embodiment for a detailed procedure, which is not repeatedly described here.

Furthermore, the charging system provided in the eighth embodiment of the present invention may further include:

a charging request receiving unit 360, configured to receive a subscriber charging data obtaining request sent by the policy decision apparatus;

a charging data obtaining unit 370, configured to, according to the subscriber charging data obtaining request, obtain current charging relevant data of a subscriber; and a charging data sending unit 380, configured to send the current charging relevant data of the subscriber to the policy decision apparatus.

Figure 14:
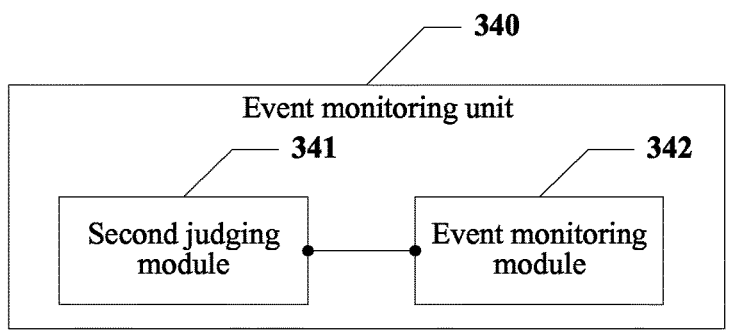
FIG. 14 is a schematic structural diagram of a monitoring unit in a charging system according to an embodiment of the present invention.

FIG. 14 is a schematic structural diagram of a monitoring unit in a charging system according to an embodiment of the present invention. In the charging system provided in the eighth embodiment of the present invention, the event obtaining unit 330 is further configured to obtain a precondition corresponding to the charging relevant event to be monitored.

In this case, the event monitoring unit 340 in the charging system may specifically include:

a second judging module 341, configured to determine whether the precondition of the charging relevant event is satisfied; and an event monitoring module 342, configured to, when the second judging module 341 judges that the precondition is satisfied, monitor whether the charging relevant event satisfying the precondition occurs.

Figure 15:
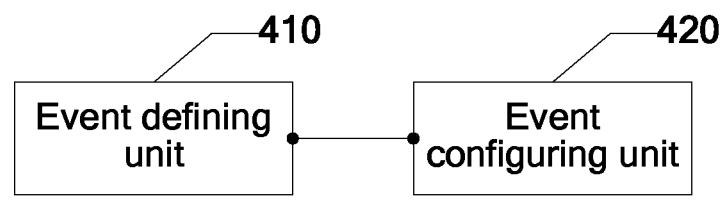
FIG. 15 is a schematic structural diagram of a management node device according to a ninth embodiment of the present invention.

FIG. 15 is a schematic structural diagram of a management node device according to a ninth embodiment of the present invention.

The embodiments of the present invention further provides a management node device, including:

an event defining unit 410, configured to define a charging relevant event according to an operator policy or subscriber subscription information, and meanwhile define an event class, and a charging system processing rule and policy generation rule which are corresponding to the charging relevant event; and an event configuring unit 420, configured to, based on the class of the charging relevant event, respectively configure the charging relevant event, the policy generation rule and the charging system processing rule for the policy decision apparatus and the charging system, so that the charging system and the policy decision apparatus perform different processing on different classes of charging relevant events.

It should be noted that, the management node device in the embodiment of the present invention may be integrated to the policy decision apparatus or the charging system, that is, used as a certain function module in the policy decision apparatus or the charging system.

Figure 16:
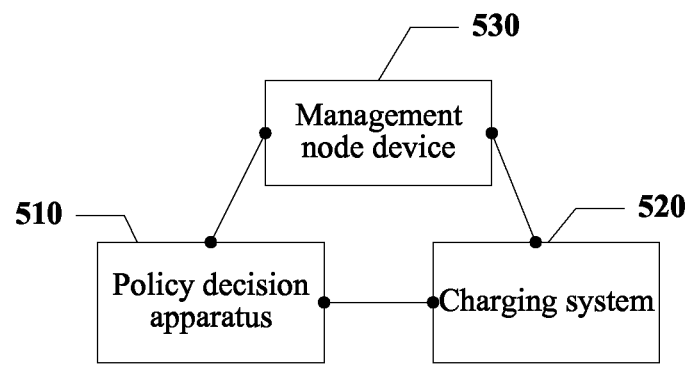
FIG. 16 is a schematic structural diagram of a policy control system according to a tenth embodiment of the present invention.

FIG. 16 is a schematic structural diagram of a policy control system according to a tenth embodiment of the present invention.

The embodiments of the present invention further provide a policy control system, including: a policy decision apparatus 510, a charging system 520, and a management node device 530. Reference may be made to the foregoing corresponding apparatus embodiments for specific structures of the policy decision apparatus 510 and the charging system 520 and the management node device 530, which are not repeatedly described here.

It should be noted that, reference may be made to the illustration of the method embodiments of the present invention for the content such as information interaction among the units and modules and the execution procedures in the foregoing systems and apparatus because they are based on the same concept as the method embodiments of the present invention, which are not repeatedly described here.

Reference may all made be to the relevant procedures provided in each foregoing method embodiment for interaction among the units provided in each apparatus, server, and system embodiment of the present invention and relevant information, and reference may be made to each foregoing embodiment for a specific function and processing process, which are not repeatedly described here.

Persons of ordinary skill in the art may understand that all or part of the processes of the methods according to the foregoing embodiments may be implemented by a computer program instructing relevant hardware. The program may be stored in a computer readable storage medium. When the program is run, the processes of each foregoing method according to the embodiments are included. The storage medium may be a magnetic disk, a compact disk, a read-only memory (Read-Only Memory, ROM), a random access memory (Random Access Memory, RAM), and the like.

The policy control method and system, and the relevant apparatus of the present invention are introduced in detail in the foregoing. Persons of ordinary skill in the art may make changes to both the specific implementation manners and the application scope according to the idea in the embodiments of the present invention, and the content of the specification shall not be construed as a limitation of the present invention.

What is claimed is:

1. A method for telecommunication system to implement service data flow control based on a subscriber identifier, comprising
receiving, by a policy decision apparatus, a control policy request sent from a gateway device, wherein the control policy request carries a subscriber identifier;
sending, by the policy decision apparatus, a session request message to a charging system, wherein the session request message carries the subscriber identifier;
sending, by the charging system, according to the session request message, to the policy decision apparatus, a response message to the session request message to indicate that a session between the policy decision apparatus and the charging system has been established;
monitoring, by the charging system, occurrence of a non-subscribed charging relevant event, wherein the non-subscribed charging relevant event has not been subscribed to by the policy decision apparatus;
sending, by the charging system, a notification message to the policy decision apparatus through the established session in case of the occurrence of the non-subscribed charging relevant event, wherein the notification message carries information about the occurred non-subscribed charging relevant event ;
generating, by the policy decision apparatus, a control policy according to the notification message from the charging system; and
sending, by the policy decision apparatus, the control policy to the gateway device in response to the control policy request.

2. The method according to claim 1, wherein the non-subscribed charging relevant event corresponds to the subscriber identifier.

3. The method according to claim 1, further comprising: before the monitoring, obtaining, by the charging system, according to the subscriber identifier, the non-subscribed charging relevant event.

4. The method according to claim 3, wherein the obtaining the non-subscribed charging relevant event comprises:
retrieving, by the charging system in a set of the charging relevant events, the non-subscribed charging relevant event corresponding to the subscriber identifier.

5. The method according to claim 1, wherein the policy decision apparatus is a Policy and Charging Rules Function (PCRF), the charging system is an Online Charging System (OCS), and the gateway device is a Policy and Charging Execution Function (PCEF).

6. A telecommunication system for implementing service data flow control based on a subscriber identifier, comprising:
a policy decision apparatus comprising: at least one processor; and a memory coupled to the processor, the memory including instructions executable by the at least one processor to:
receive a control policy request from a gateway device, the control policy request carrying a subscriber identifier; and
send a session request message carrying the subscriber identifier;
a charging system comprising: at least one processor; and a memory coupled to the processor, the memory including instructions executable by the at least one processor to:
receive the session request message sent by the policy decision apparatus;
send, according to the received session request message, a response message to the session request message to indicate that a session between the policy decision apparatus and the charging system has been established;
monitor occurrence of a non-subscribed charging relevant event, wherein the non-subscribed charging relevant event is not subscribed to by the policy decision apparatus; and
send, through the established session, a notification message to the policy decision apparatus in case of the occurrence of the non-subscribed charging relevant event, the notification message carrying information about the occurred non-subscribed charging relevant event,
wherein the at least one processor of the policy decision apparatus is further configured to:
generate a control policy according to the notification message; and
send, to the gateway device, the control policy in response to the control policy request.

7. The telecommunication system according to claim 6, wherein at least one processor of the charging system is further configured to obtain the non-subscribed charging relevant event according to the subscriber identifier.

8. The telecommunication system according to claim 7, wherein the non-subscribed charging relevant event is obtained, according to the subscriber identifier, from a set of charging relevant events, the obtained non-subscribed charging relevant event being corresponding to the subscriber identifier.

9. The telecommunication system according to claim 6, wherein the policy decision apparatus is a Policy and Charging Rules Function (PCRF), the charging system is an Online Charging System (OCS), and the gateway device is a Policy and Charging Execution Function (PCEF).

10. The method according to claim 6, wherein the non-subscribed charging relevant event corresponds to the subscriber identifier.

* * * * *